United States Patent
Binette et al.

(10) Patent No.: US 6,682,440 B2
(45) Date of Patent: *Jan. 27, 2004

(54) GOLF BALL WITH MULTI-LAYER COVER

(75) Inventors: Mark L. Binette, Ludlow, MA (US); Michael J. Sullivan, Barrington, RI (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/163,213

(22) Filed: Jun. 5, 2002

(65) Prior Publication Data

US 2003/0153408 A1 Aug. 14, 2003

Related U.S. Application Data

(63) Continuation-in-part of application No. 09/839,816, filed on Apr. 20, 2001, now Pat. No. 6,561,928, which is a continuation of application No. 09/335,302, filed on Jun. 17, 1999, now Pat. No. 6,220,972, which is a continuation-in-part of application No. 08/743,579, filed on Nov. 4, 1996, now Pat. No. 5,833,553, which is a continuation-in-part of application No. 08/240,259, filed on May 10, 1994, now abandoned, which is a continuation-in-part of application No. 08/054,406, filed on Apr. 28, 1993, now Pat. No. 5,368,304.

(51) Int. Cl.[7] .............................................. A63B 37/06

(52) U.S. Cl. ...................................................... 473/374

(58) Field of Search ................................. 473/370, 371, 473/372, 373, 374, 376, 377, 378

(56) References Cited

U.S. PATENT DOCUMENTS

| | | |
|---|---|---|
| 3,784,209 A | 1/1974 | Berman et al. |
| 4,085,937 A | 4/1978 | Schenk |
| 4,123,061 A | 10/1978 | Dusbiber |
| 4,141,559 A | 2/1979 | Melvin et al. |

(List continued on next page.)

*Primary Examiner*—Mark S. Graham
*Assistant Examiner*—Raeann Gorden

(57) ABSTRACT

A golf ball having a core comprising metallocene catalyzed polyolefin and having a PGA compression of no greater than about 85 and a multi-layered cover disposed about the core having a thickness of at least about 3.6 mm is described. A golf ball is also described having a core with a PGA compression of no greater than about 85 and a multi-layer cover with a thickness of at least 3.6 mm (0.142 inches) and a Shore D hardness of at least about 60 wherein at least one layer of the multi-layered cover comprises a high acid ionomer resin having at least 16% by weight of an alpha, beta-unsaturated carboxylic acid. The combination of a core with a thick, relatively hard multi-layer cover results in a ball having better distance than conventional golf balls having a comparable coefficient of restitution.

27 Claims, 2 Drawing Sheets

U.S. PATENT DOCUMENTS

| | | |
|---|---|---|
| 4,234,184 A | 11/1980 | Deleens et al. |
| 4,274,637 A | 6/1981 | Molitor |
| 4,431,193 A * | 2/1984 | Nesbitt .................. 473/374 |
| 4,483,537 A | 11/1984 | Hanada et al. |
| 4,546,980 A | 10/1985 | Gendreau et al. |
| 4,674,751 A | 6/1987 | Molitor et al. |
| 4,696,475 A * | 9/1987 | Tomita et al. ............ 473/365 |
| 4,715,607 A | 12/1987 | Llort et al. |
| 4,726,590 A | 2/1988 | Molitor |
| 4,770,422 A * | 9/1988 | Isaac .................... 473/372 |
| 4,801,649 A | 1/1989 | Statz |
| 4,852,884 A | 8/1989 | Sullivan |
| 4,863,167 A * | 9/1989 | Matsuki et al. .......... 473/373 |
| 4,884,814 A | 12/1989 | Sullivan |
| 4,968,038 A | 11/1990 | Yamada |
| 4,986,545 A | 1/1991 | Sullivan |
| 5,019,320 A | 5/1991 | Hasegawa et al. |
| 5,072,944 A | 12/1991 | Nakahara et al. |
| 5,098,105 A | 3/1992 | Sullivan |
| 5,120,791 A | 6/1992 | Sullivan |
| 5,187,013 A | 2/1993 | Sullivan |
| 5,209,485 A | 5/1993 | Nesbitt et al. |
| 5,222,739 A * | 6/1993 | Horiuchi et al. ........... 473/356 |
| 5,253,871 A | 10/1993 | Viollaz |
| 5,298,571 A * | 3/1994 | Statz et al. ............ 525/330.2 |
| 5,314,187 A | 5/1994 | Proudfit |
| 5,328,959 A | 7/1994 | Sullivan |
| 5,330,837 A | 7/1994 | Sullivan |
| 5,368,304 A * | 11/1994 | Sullivan et al. .......... 473/377 |
| 5,433,447 A | 7/1995 | Pocklington |
| 5,439,227 A | 8/1995 | Egashira et al. |
| 5,628,699 A | 5/1997 | Maruko et al. |
| 5,703,166 A * | 12/1997 | Rajagopalan et al. ....... 525/196 |
| 5,824,746 A * | 10/1998 | Harris et al. ............. 525/196 |
| 5,833,553 A | 11/1998 | Sullivan et al. |
| 6,220,972 B1 * | 4/2001 | Sullivan et al. .......... 473/374 |

* cited by examiner

GOLF BALL WITH MULTI-LAYER COVER

CROSS REFERENCE TO RELATED APPLICATIONS

This is a continuation-in-part of U.S. patent application Ser. No. 09/839,816, filed Apr. 20, 2001, and issued as U.S. Pat. No. 6,561,928, which is a continuation of U.S. patent application Ser. No. 09/335,302 filed Jun. 17, 1999, and issued as U.S. Pat. No. 6,220,972, which is a continuation-in-part of U.S. patent application Ser. No. 08/743,579 filed Nov. 4, 1996, and issued as U.S. Pat. No. 5,833,553, which is a continuation-in-part of U.S. patent application Ser. No. 08/240,259 filed May 10, 1994, now abandoned, which in turn is a continuation-in-part of U.S. patent application Ser. No. 08/054,406, filed Apr. 28, 1993, which issued as U.S. Pat. No. 5,368,304

FIELD OF THE INVENTION

The present invention is directed to golf balls having metallocene catalyzed polyolefin cores and relatively thick covers comprising one or more layers that are durable and resistant to cracks and fractures.

In another aspect, the present invention is directed to golf balls having a thick multi-layer cover where at least one of the cover layers has at least one high acid ionomer resin.

BACKGROUND OF THE INVENTION

Top grade golf balls sold in the United States generally comprise a central core with one or more cover layers formed thereover. A golf ball cover is particularly influential in effecting the compression (feel) and durability (i.e., impact resistance, etc.) of the resulting ball. Various cover compositions have been developed in order to optimize desired properties of the resulting golf balls.

FIGS. 1 and 2 illustrate a conventional golf ball 10 having a single cover layer 14 molded about a golf ball core 16. FIG. 2 illustrates (in an exaggerated view) stress lines 12 extending partially, or entirely across the thickness of the cover layer 14. Stress lines 12 typically result in a crack or fracture across the thickness of the golf ball cover. FIGS. 1 and 2 illustrate one problem that may occur when a very thick, single layer cover is formed about a golf ball core.

Although not wishing to be bound to any particular theory, it is believed that stress lines in a golf ball cover, such as stress lines 12 in cover 14, result from repeated strikes with a golf club, particularly drivers, and temperature effects. Stress lines often serve as initiation sites for crack or fracture propagation in a golf ball cover material. Such cracks or fractures, and their related stress lines, are undesirable in golf ball covers. Moreover, it is particularly undesirable for such stress lines and the resulting cracks or fractures to extend across the entire thickness of a golf ball cover since such damage significantly impairs golf ball performance. And, such cracks or fractures greatly reduce the durability of a golf ball cover.

When a multi-layer cover is employed, each cover layer traditionally has had a significantly different Shore D hardness than an adjacent cover layer in order to impart to the golf ball a particular desired combination of spin and distance characteristics. Although the use of a multi-layer cover configuration reduces the tendency of stress lines, and thus cracks and fractures, propagating across the entire thickness of the cover, such multi-layer arrangement of cover materials, each having its own particular set of properties and characteristics, has associated design and manufacturing problems.

For instance, in order to produce a multiple cover layer golf ball that exhibits a desired set of performance characteristics, it is necessary to design and anticipate an overall performance profile for the set of cover layers. This involves analyzing each of the individual cover layers and any and all effects between the individual cover layers. Even if such daunting design analysis is performed, the increased number of variables may lead to unanticipated difficulties in manufacturing or with the final product golf ball.

In addition, although, once again, not wishing to be bound to any particular theory, it is believed that although a multiple cover layer configuration may reduce the tendency for cracks or fractures that extend through the entire thickness of the cover, such configuration may lead to an increase in the number or frequency of fractures, particularly in applications in which the various cover layers constituting the multi-layer cover each have different physical properties such as hardness and flexural characteristics.

Accordingly, there is a need for an improved golf ball which is less susceptible to cracking or fracturing across the thickness of the cover than currently known single cover layer golf balls. And, there is a need for an improved multiple cover layer golf ball that is simpler to design and manufacture, and which is less susceptible to cracking or fracturing of one or more of the individual cover layers that constitute the multiple cover layer of the ball.

In addition to the features sought above, it would also be useful to develop the above golf balls having reduced amounts of polybutadiene in the core in order to improve mechanical properties and durability, while maintaining desirable feel.

BRIEF SUMMARY OF THE INVENTION

The present invention is directed to a golf ball comprising a solid core and a multi-layer cover disposed about the core. The solid core comprises a metallocene catalyzed polyolefin and has a PGA compression of about 85 or less. The multi-layer cover has an overall cover thickness of at least about 3.6 mm (0.142 inches).

The present invention is further directed to a golf ball comprising a core and multi-layer cover disposed about the core. The core comprises a metallocene catalyzed polyolefin, has a coefficient of restitution of at least 0.650 and a PGA compression of no greater than 85. The multi-layer cover has at least one cover layer comprising an ionomer. The multi-layer cover also has a thickness of at least about 3.8 mm (0.150 inches) and a Shore D hardness of at least about 60. The golf ball has a coefficient of restitution of at least about 0.770.

The present invention is yet further directed to a golf ball comprising a core, a first cover layer disposed about the core, and a second cover layer disposed about the first cover layer. The core comprises a metallocene catalyzed polyolefin and has a PGA compression of no greater than 85. The first cover layer includes a first resin composition and a filler material. The second cover layer includes a second resin composition. The second resin composition is different from the first resin composition and the difference between the Shore D hardness of the first cover layer and second cover layer is less than about 2.

In another aspect, the present invention is directed to a golf ball having a solid core and a multi-layer cover disposed about the core. The core has a PGA compression of no greater than about 85. The multi-layer cover has an overall thickness of at least about 3.6 mm (0.142 inches) and a Shore D hardness of at least about 60. At least one layer of the multi-layer cover comprises a high acid ionomer having at least 16% by weight of an alpha, beta-unsaturated carboxylic acid.

In yet a further aspect, the present invention is directed to a golf ball comprising a core and multi-layer cover disposed about the core. The core comprises at least one member selected from the group consisting of polybutadiene and natural rubber. The core has a coefficient of restitution of at least about 0.650 and a PGA compression of no greater than about 85. The multi-layer cover comprises at least one layer having a high acid ionomer having at least 16% by weight of an alpha, beta-unsaturated carboxylic acid. The multi-layer cover has a thickness of at least about 3.8 mm (0.150 inches) and a Shore D hardness of at least about 60. The golf ball has a coefficient of restitution of at least about 0.770.

In a further aspect, the present invention is directed to a golf ball comprising a core, a first cover layer disposed about the core, and a second cover layer disposed about the first cover layer. The first cover layer has a first resin composition and the second cover layer has a second resin composition, and the difference in Shore D hardness between the first and second cover layers is less than about 2. The overall thickness of the first and second layers is at least 3.6 mm. At least one of said first cover layer and second cover layer comprises a high acid ionomer having at least 16% by weight of an alpha, beta-unsaturated carboxylic acid.

In yet another embodiment, the present invention is directed to a golf ball comprising a core and a multi-layer cover disposed about the core. The solid core comprises a metallocene catalyzed polyolefin. The multi-layer cover has an overall thickness of at least about 3.6 mm (0.142 inches) and a Shore D hardness of at least about 60. At least one cover layer comprises a high acid ionomer resin having at least 16% by weight of an alpha, beta-unsaturated carboxylic acid

BRIEF DESCRIPTION OF THE DRAWINGS

The following is a brief description of the drawings which are presented for the purposes of illustrating the invention and not for the purposes of limiting the same.

DETAILED DESCRIPTION OF THE PREFERRED EMBODIMENTS

The present invention generally provides a golf ball having a multiple layer cover in which one or more properties of each of the individual cover layers are matched so that certain desired properties are the same, or substantially so. In several of the preferred embodiments described herein, the individual cover layers all have the same, or nearly the same, Shore D hardness. The present invention includes matching of one or more further properties or characteristics of individual cover layers in a multiple cover layer assembly utilized in a golf ball. The present invention is embodied in golf balls having multi-layer cover assemblies comprising two, three, or more cover layers.

In a particularly preferred aspect, the golf ball of the present invention has a solid core having a coefficient of restitution (C.O.R.) of at least about 0.650 in combination with a thick, relatively hard cover assembly which is formed from two or more layers. Each cover layer has a Shore D hardness within 5 points, and preferably within 2 points, of the Shore D hardness of all other cover layers.

Figure 1:
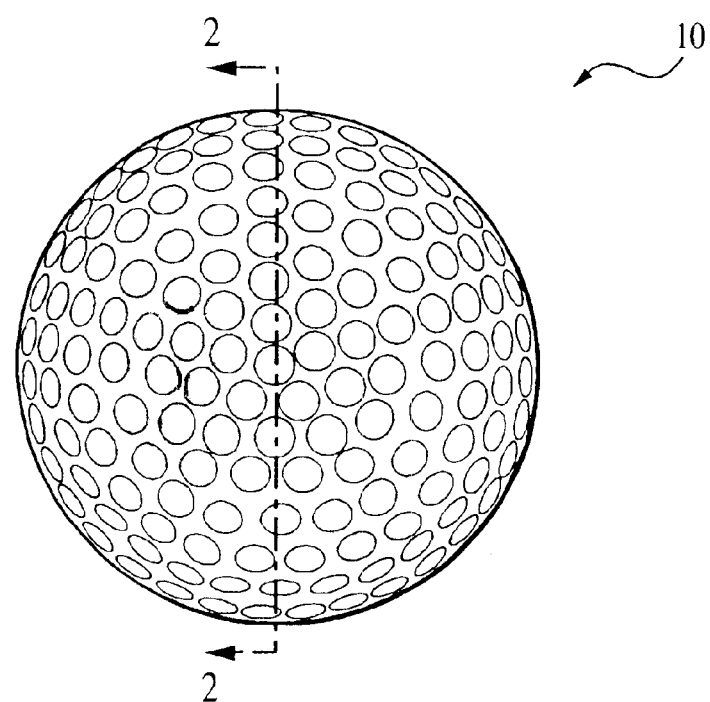
FIG. 1 is a perspective view of a conventional single cover layer golf ball.
Figure 2:
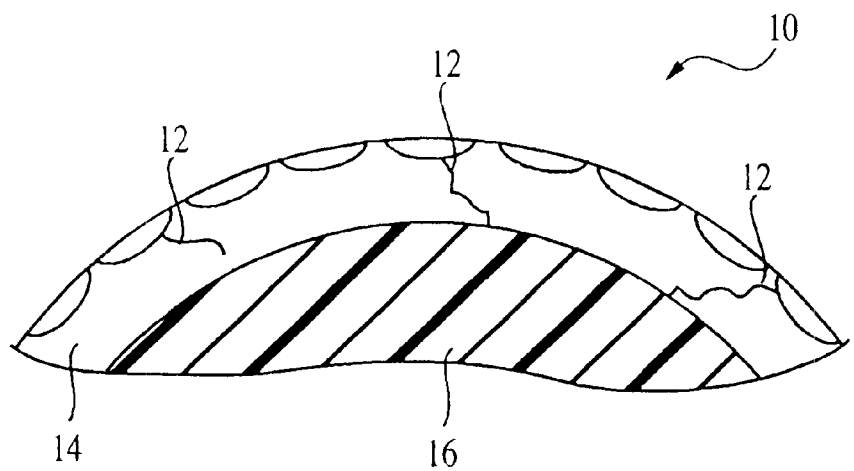
FIG. 2 is a partial cross sectional view of the golf ball depicted in FIG. 1, taken across line 2—2, illustrating stress lines extending partially or entirely across the thickness of the golf ball cover.
Figure 3:
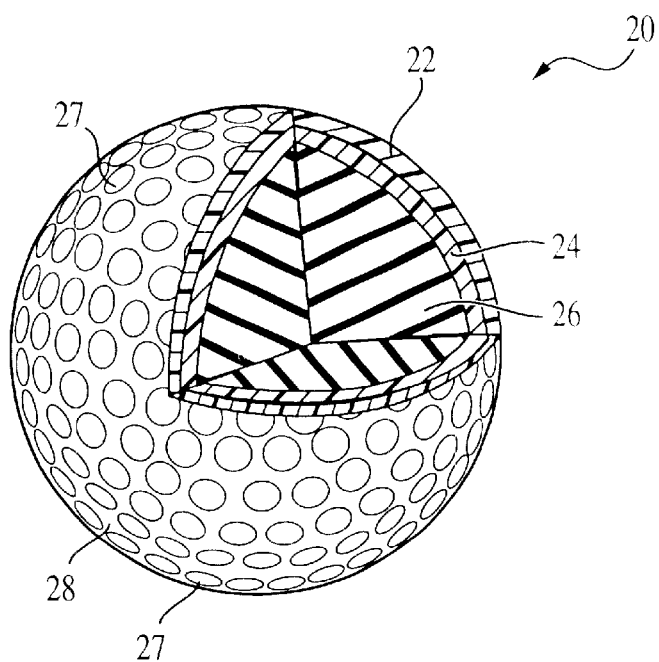
FIG. 3 is a partial cross section of a solid golf ball with a dual layer cover according to the present invention.

Referring to the drawings and particularly to FIG. 3, a first preferred embodiment of a golf ball according to the present invention is shown and is designated as 20. The golf ball 20 has a core 26. The core 26 can consist of a solid or wound core and can consist of one or more layers.

A multi-layer cover surrounds the core 26. The multi-layer cover includes a non-dimpled inner cover layer 24 and a dimpled outer cover layer 22. The outer cover layer 22 defines a plurality of dimples 27 and an outer surface 28 to form an unfinished golf ball.

A thin primer coat (not shown) is applied to the outer surface of cover layer 22. A thin top coat (not shown) surrounds the primer coat to form a finished ball. Optionally, one or more pigmented paint coat(s) can be substituted for the primer coat and/or top coat.

In one preferred embodiment, the core 26 is relatively soft, with a PGA compression of about 85 or less, preferably about 20 to 85, and more preferably about 40 to 60. PGA compression is described and defined herein below.

The multi-layer cover has a thickness of at least about 3.6 mm (0.142 inches). It is particularly preferred that the cover thickness be at least 3.8 mm (0.150 inches). Particularly good results are obtained when the cover has a thickness of at least 4.0 mm (0.157 inches). In certain circumstances, such as when a harder compression and harder feel may be desired, it is useful to employ a cover having a thickness of at least 4.5 mm (0.177 inches). The thickness of the individual cover layers may vary depending upon the thicknesses of the other cover layers and the desired overall cover layer thickness. It may, in some applications, be desirable to form the outermost cover layer to be relatively thick due to the presence of the dimples.

As used herein, "overall cover thickness" is the thickness of the multi-layer cover as measured from the inner diameter of the innermost cover to the outer surface of the outermost or exterior cover at a land (i.e. non-dimpled) area. The "cover layer thickness" of any particular cover layer is the thickness of the layer from its inner diameter to its outer surface. If the outer surface of the layer is dimpled, the measurement is made to a land area of the cover layer.

The preferred golf ball of the present invention preferably exhibits a difference between the coefficient of restitution of the ball and the coefficient of restitution of the core of at least about 0.025, preferably at least 0.035, and more preferably at least 0.045. The golf balls exhibit an unexpectedly long distance upon impact or drives given their coefficient of restitution.

In one preferred embodiment, each layer of the multi-layer cover assembly has a Shore D hardness of 60 to 80, more preferably 62 to 75, and most preferably 65 to 70.

The golf balls of the present invention can be produced by molding processes currently well known in the golf ball art. Specifically, the golf balls can be produced by injection molding or compression molding the novel cover compositions about wound or solid molded cores to produce a golf ball having a diameter of about 1.680 to about 1.800 inches and weighing about 1.620 ounces. The standards for both the minimum diameter and maximum weight of the balls have been established by the United States Golf Association (USGA®).

Although both solid core and wound cores can be utilized in the present invention, as a result their lower cost and superior performance, solid molded cores are preferred over wound cores.

The term "solid cores" as used herein refers not only to one piece cores but also to those cores having a separate solid layer beneath the cover and above the core as in U.S. Pat. No. 4,431,193, and other multi-layer and/or non-wound cores. The compositions of suitable cores that can be incorporated into the present invention are presented in more detail below.

The layers of the multi-layer cover may be formed from generally the same resin composition, or may be formed from different resin compositions with similar hardnesses. For example, one cover layer may be formed from an ionomeric resin of ethylene and methacrylic acid, while another layer is formed from an ionomer of ethylene and acrylic acid. One or more cover layers may contain polyamides or polyamide-nylon copolymers or intimate blends thereof. Furthermore, polyurethanes, PEBAX® polyetheramide, HYTREL® polyesteramide, and/or thermosetting polyurethanes can be used. In order to visibly distinguish the layers, various colorants, metallic flakes, phosphorous, florescent dyes, florescent pigments, etc. can be incorporated in the resin. Preferably, the various cover layers are made of at least 50 weight % ionomer based upon 100 parts by weight of resin composition, and more preferably 75 or more weight % ionomer. Additional description and details of suitable materials for cover layers are provided herein.

Preferable cover materials for use as inner or outer cover layers include, for example, zinc, sodium and lithium ionomers, and blends of ionomers with harder non-ionic polymers such as nylon, polyphenylene oxide, metallocene catalyzed polyolefins, and other compatible thermoplastics. A wide array of nylon materials or blends thereof can be incorporated in the present invention golf ball covers. This is described in greater detail herein. Moreover, various suitable ionomers are further described below. Furthermore, examples of cover compositions which may be used are set forth in detail U.S. Pat. No. 6,267,693, and U.S. Pat. No. 5,688,869, all of which are incorporated herein by reference. The cover compositions are not limited in any way to the compositions set forth in said copending applications.

Figure 4:
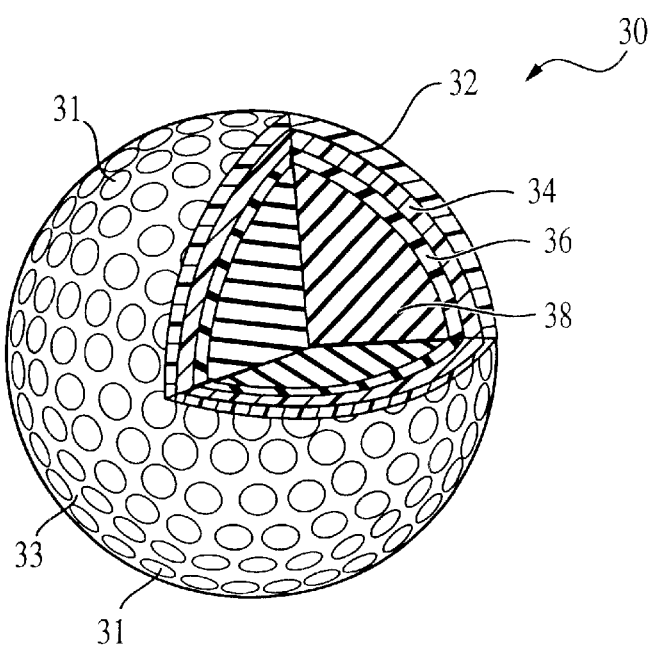
FIG. 4 is a partial cross section of a solid golf ball with a three layer cover according to an alternative embodiment of the present invention.

A further embodiment of a golf ball according to the present invention is shown in FIG. 4, and is designated as golf ball 30. The ball 30 has a core 38, as is illustrated in FIG. 4. The core 38 preferably has a PGA compression of about 85 or less, preferably 20 to 85, and more preferably 40 to 60.

A multi-layer cover having three layers is formed over the core 38 to produce an unfinished golf ball. In the embodiment shown, the cover includes an inner cover layer 36, an intermediate inner cover layer 34 and an outer cover layer 32. Again, as in the embodiment illustrated in FIG. 3, further finished coat(s) (not shown) can be included to produce a finished golf ball. The inner, intermediate, and outer cover layers 36, 34 and 32 respectively, preferably exhibit substantially the same Shore D hardness. Restated, the difference between the Shore D hardness of any two of these cover layers is preferably 5 or less, and most preferably is 2 or less. Preferably, each of the cover layers 36, 34 and 32 has a Shore D hardness of 60 to 80, more preferably 62 to 75, and most preferably 65 to 70.

The overall thickness of the multi-layer cover assembly shown in FIG. 4 can be the same as the thickness of the multi-layer cover assembly of the embodiment of FIG. 3. The thickness of the individual cover layers may vary depending upon the thicknesses of the other cover layers and the desired overall cover layer thickness. It may, in some applications, be desirable to form the outermost cover layer to be relatively thick due to the presence of the dimples. The three cover layers 36, 34 and 32 can be formed from the same or different resin compositions, and preferably comprise ionomer, ionomer blends, etc.

A detailed description of the various components and materials utilized in the present invention golf balls is set forth below after a description of various golf ball properties and their measurement. Moreover, further multiple cover layers are also included as being within the scope of the present invention.

As used herein, "Shore D hardness" of a cover is measured generally in accordance with ASTM® D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

Two principal properties involved in golf ball performance are resilience and PGA compression. Resilience is determined by the coefficient of restitution (C.O.R.), i.e. the constant "e" which is the ratio of the relative velocity of an elastic sphere after direct impact to that before impact. As a result, the coefficient of restitution ("e") can vary from 0 to 1, with 1 being equivalent to a perfectly or completely elastic collision and 0 being equivalent to a perfectly or completely inelastic collision.

Resilience (C.O.R.), along with additional factors such as club head speed, angle of trajectory and ball configuration (i.e., dimple pattern) generally determine the distance a ball will travel when hit. Since club head speed and the angle of trajectory are factors not easily controllable by a manufacturer, factors of concern among manufacturers are the coefficient of restitution (C.O.R.) and the surface configuration of the ball.

The coefficient of restitution (C.O.R.) in solid core balls is a function of the composition of the molded core and of the cover. In balls containing a wound core (i.e., balls comprising a liquid or solid center, elastic windings, and a cover), the coefficient of restitution is a function of not only the composition of the center and cover, but also the composition and tension of the elastomeric windings.

The coefficient of restitution is the ratio of the outgoing velocity to the incoming velocity. In the examples of this application, the coefficient of restitution of a golf ball was measured by propelling a ball horizontally at a speed of 125±1 feet per second (fps) against a generally vertical, hard, flat steel plate and measuring the ball's incoming and outgoing velocity electronically. Speeds were measured with a pair of Ohler Mark 55 ballistic screens, which provide a timing pulse when an object passes through them. The screens are separated by 36 inches and are located 25.25 inches and 61.25 inches from the rebound wall. The ball speed was measured by timing the pulses from screen 1 to screen 2 on the way into the rebound wall (as the average speed of the ball over 36 inches), and then the exit speed was timed from screen 2 to screen 1 over the same distance. The rebound wall was tilted 2 degrees from a vertical plane to allow the ball to rebound slightly downward in order to miss the edge of the cannon that fired it.

As indicated above, the incoming speed should be 125+/−1 fps. Furthermore, the correlation between C.O.R. and forward or incoming speed has been studied and a correction has been made over the +/−1 fps range so that the C.O.R. is reported as if the ball had an incoming speed of exactly 125.0 fps.

The coefficient of restitution must be carefully controlled in all commercial golf balls if the ball is to be within the specifications regulated by the United States Golf Association (USGA®). Along this line, the USGA® standards indicate that a "regulation" ball cannot have an initial velocity (i.e., the speed off the club) exceeding 255 feet per second in an atmosphere of 75° F. when tested on a USGA® machine. Since the coefficient of restitution of a ball is related to the ball's initial velocity, it is highly desirable to produce a ball having sufficiently high coefficient of restitution to closely approach the USGA® limit on initial velocity, while having an ample degree of softness (i.e., hardness) to produce enhanced playability (i.e., spin, etc.).

As indicated above, PGA compression is another important property involved in the performance of a golf ball. The compression of the ball can affect the playability of the ball on striking and the sound or "click" produced. Similarly, compression can effect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the clubface and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates.

The term "compression" utilized in the golf ball trade generally defines the overall deflection that a golf ball undergoes when subjected to a compressive load. For example, PGA compression indicates the amount of change in golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multi-layer solid core balls exhibit much more consistent compression readings than balls having wound cores such as the thread wound three-piece balls.

In the past, PGA compression related to a scale of from 0 to 200 given to a golf ball. The lower the PGA compression value, the softer the feel of the ball upon striking. In practice, tournament quality balls have compression ratings around 70 to 110, and preferably around 80 to 100.

In determining PGA compression using the 0 to 200 scale, a standard force is applied to the external surface of the ball. A ball which exhibits no deflection (0.0 inches in deflection) is rated 200 and a ball which deflects 2/10th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200 to 100) and a ball which deflects 0.110 inches (110×0.001 inches) has a PGA compression of 90 (i.e., 200 to 110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by OK Automation, Sinking Spring, Pa. (formerly Atti Engineering Corporation of Newark, N.J.). The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the spring-loaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Philadelphia, Pa. to evaluate compression of the various components (i.e., cores, mantle cover balls, finished balls, etc.) of the golf balls. The Riehle compression device determines deformation in thousandths of an inch under a load designed to emulate the 200 pound spring constant of the other compression testers. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression equals 160 minus Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is known. These devices have been designed, such as a Whitney Tester, to correlate or correspond to PGA compression through a set relationship or formula.

Core

The core which is used to form the golf balls of the present invention can be solid, foamed, wound, hollow or liquid. The core can be unitary, or can have two or more core layers. A solid core or solid layer of a multi-layer core can be thermosetting or thermoplastic. Preferably, the core is solid and is formed from a thermoset material.

Solid cores of the more preferred embodiment of the present invention can be manufactured using relatively conventional techniques. In this regard, the core compositions of the invention may be based on polybutadiene, natural rubber, metallocene catalyzed polyolefins such as EXACT® (ExxonMobil Corporation) and ENGAGE® (DuPont Dow Elastomers LLC), polyurethanes, other thermoplastic or thermoset elastomers, and mixtures of one or more of the above materials with each other and/or with other elastomers. The core may be formed from a uniform composition or may be a dual or multi-layer core. The core may be foamed or unfoamed.

Preferably, the base elastomer has a relatively high molecular weight. Polybutadiene has been found to be particularly useful because it imparts to the golf balls a relatively high coefficient of restitution. Polybutadiene can be cured using a free radical initiator such as a peroxide, or can be sulfur-cured. A broad range for the molecular weight of preferred base elastomers is from about 50,000 to about 500,000. A more preferred range for the molecular weight of the base elastomer is from about 100,000 to about 500,000. As a base elastomer for the core composition, cis-1-4-polybutadiene is preferably employed, or a blend of cis-1-4-polybutadiene with other elastomers may also be utilized. Most preferably, cis-1-4-polybutadiene having a weight-average molecular weight of from about 100,000 to about 500,000 is employed. Along this line, it has been found that the high cis-1-4-polybutadienes manufactured and sold by Bayer AG, Germany, under the trade name TAKTENE® 220 or 1220 are particularly preferred. Furthermore, the core may be comprised of a crosslinked natural rubber, EPDM, metallocene catalyzed polyolefin, or another crosslinkable elastomer.

When polybutadiene is used for golf ball cores, it commonly is crosslinked with an unsaturated carboxylic acid co-crosslinking agent. The unsaturated carboxylic acid component of the core composition typically is the reaction product of the selected carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the core compositions are acrylic acid, methacrylic acid, itaconic acid, crotonic acid, sorbic acid, and the like, and mixtures thereof. Preferably, the acid component is either acrylic or methacrylic acid. Usually, from about 5 to about 40, and preferably from about 15 to about 30 parts by weight of the carboxylic acid salt, such as zinc diacrylate, is included in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercially available peroxides are LUPERCO® 230 or 231 XL sold by Atofina Chemicals, Inc., Lucidol Division, Buffalo, N.Y., and TRIGONOX® 17/40 or 29/40 sold by Akzo Chemicals, America, Chicago, Ill. In this regard LUPERCO® 230 XL and TRIGONOX® 29/40 are comprised of 1,1-bis(t-butylperoxy)-3,3,5-trimethyl cyclohexane. The one hour half life of LUPERCO® 231 XL is about 112° C., and the one hour half life of TRIGONOX® 29/40 is about 129° C.

The core compositions of the present invention may additionally contain any other suitable and compatible modifying ingredients including, but not limited to, metal oxides, fatty acids, and diisocyanates and polypropylene powder resin. For example, PAPI® 94, a polymeric diisocyanate, commonly available from The Dow Chemical Co., Midland, Mich., is an optional component in the rubber compositions. It can range from about 0 to 5 parts by weight per 100 parts by weight rubber (phr) component, and acts as a moisture scavenger. In addition, it has been found that the addition of a polypropylene powder resin results in a core which is hard (i.e. exhibits high PGA compression) and thus allows for a reduction in the amount of crosslinking co-agent utilized to soften the core to a normal or below normal compression.

Furthermore, because polypropylene powder resin can be added to a core composition without an increase in weight of the molded core upon curing, the addition of the polypropylene powder allows for the addition of higher specific gravity fillers, such as mineral fillers. Since the crosslinking agents utilized in the polybutadiene core compositions are expensive and/or the higher specific gravity fillers are relatively inexpensive, the addition of the polypropylene powder resin substantially lowers the cost of the golf ball cores while maintaining, or lowering, weight and compression.

The polypropylene ($C_3H_5$) powder suitable for use in the present invention has a specific gravity of about 0.90 g/cm$^3$, a melt flow rate of about 4 to about 12 and a particle size distribution of greater than 99% through a 20 mesh screen. Examples of such polypropylene powder resins include those sold by the BP Amoco Chemical Co., Chicago, Ill., under the designations "6400 P", "7000 P" and "7200 P". Generally, from 0 to about 25 parts by weight polypropylene powder per each 100 parts of elastomer are included in the present invention.

Various activators may also be included in the compositions of the present invention. For example, zinc oxide and/or magnesium oxide are activators for the polybutadiene. The activator can range from about 2 to about 30 parts by weight per 100 parts by weight of the rubbers (phr) component.

Moreover, reinforcement agents may be added to the core compositions of the present invention. Since the specific gravity of polypropylene powder is very low, and when compounded, the polypropylene powder produces a lighter molded core, when polypropylene is incorporated in the core compositions, relatively large amounts of higher specific gravity fillers may be added so long as the specific core weight limitations are met. As indicated above, additional benefits may be obtained by the incorporation of relatively large amounts of higher specific gravity, inexpensive mineral fillers such as calcium carbonate. Such fillers as are incorporated into the core compositions should be in finely divided form, as for example, in a size generally less than about 30 mesh and preferably less than about 100 mesh U.S. standard size. The amount of additional filler included in the core composition is primarily dictated by weight restrictions and preferably is included in amounts of from about 10 to about 100 parts by weight per 100 parts rubber.

The preferred fillers are relatively inexpensive and heavy and serve to lower the cost of the ball and to increase the weight of the ball to closely approach the USGA® weight limit of 1.620 ounces. However, if thicker cover compositions are to be applied to the core to produce larger than normal (i.e. greater than 1.680 inches in diameter) balls, use of such fillers and modifying agents will be limited in order to meet the USGA® maximum weight limitations of 1.620 ounces. Limestone is ground calcium/magnesium carbonate and is used because it is an inexpensive, heavy filler. Ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free fatty acids having from about 10 to about 40 carbon atoms, and preferably having from about 15 to about 10 carbon atoms, are used. Exemplary of suitable fatty acids are stearic acid and linoleic acids, as well as mixtures thereof. An example of a suitable metallic salt of a fatty acid is zinc stearate. When included in the core compositions, the metallic salts of fatty acids are present in amounts of from about 1 to about 25, preferably in amounts from about 2 to about 15 parts by weight based on 100 parts rubber (elastomer). It is preferred that the core compositions include stearic acid as the fatty acid adjunct in an amount of from about 2 to about 5 parts by weight per 100 parts of rubber.

Diisocyanates may also be optionally included in the core compositions. When utilized, the diisocyanates are included in amounts of from about 0.2 to about 5.0 parts by weight based on 100 parts rubber. Exemplary of suitable diisocyanates is 4,4'-diphenylmethane diisocyanate and other polyfunctional isocyanates known in the art.

Furthermore, the dialkyl tin difatty acids set forth in U.S. Pat. No. 4,844,471, the dispensing agents disclosed in U.S. Pat. No. 4,838,556, and the dithiocarbamates set forth in U.S. Pat. No. 4,852,884 may also be incorporated into the polybutadiene compositions of the present invention. The specific types and amounts of such additives are set forth in the above identified patents, which are incorporated herein by reference.

The core compositions of the invention which contain polybutadiene are generally comprised of 100 parts by weight of a base elastomer (or rubber) selected from polybutadiene and mixtures of polybutadiene with other elastomers, 15 to 25 parts by weight of at least one metallic salt of an unsaturated carboxylic acid, and 0.5 to 10 parts by weight of a free radical initiator.

As indicated above, additional suitable and compatible modifying agents such as particulate polypropylene resin, fatty acids, and secondary additives such as pecan shell flour, ground flash (i.e. grindings from previously manufactured cores of substantially identical construction), barium sulfate, zinc oxide, etc. may be added to the core compositions to adjust the weight of the ball as necessary in order to have the finished molded ball (core, cover and coatings) to closely approach the USGA® weight limit of 1.620 ounces.

Metallocene Catalyzed Polyolefins for the Core

The core composition preferably includes a metallocene catalyzed polyolefin. Polyolefins formed from catalytic systems based on metallocenes generally provide higher versatility, better characteristics, and improved flexibility for both synthesis and structure than do polyolefins produced from conventional Ziegler-Natta catalyst systems.

Metallocene catalysts are based upon transition metals, such as titanium and zirconium, and have well-defined single catalytic sites. Generally, metallocene catalysts comprise a transition metal between ring structures to form a sterically hindered site. The structural features of metallocene catalysts allow them to form polyolefins having atactic, isotactic, syndiotactic, etc. structures.

Olefins used in producing metallocene catalyzed polyolefins are α-olefins having at least two (2) carbon atoms, including but not limited to propylene, butene, pentene, hexene, octene, decene, dodecene, and vinyl aromatic monomers such as styrene, a-methyl styrene and the like, and isomers thereof.

The present metallocene catalyzed polyolefins can be polymers, copolymers, or terpolymers. Preferably, the metallocene catalyzed polyolefin copolymers are copolymers of ethylene and propylene. Preferred metallocene polyolefin terpolymers are terpolymers of ethylene, α-olefin, and diene (EODE). A most preferred metallocene catalyzed polyolefin terpolymer is a terpolymer of ethylene, propylene, and diene (EPDM). Preferably, the density of the metallocene catalyzed polyolefin is no greater than about 0.950 $cm^2$.

Currently, two major manufacturers of metallocene catalyzed polyolefins are the ExxonMobil Corporation under the trademark EXACT® and DuPont Dow Elastomers LLC under the trademark ENGAGE®.

EXACT® polyolefins add strength and provide desirable flexibility. Presently, the following EXACT® polyolefins are available from the ExxonMobil Corporation:

TABLE 1

| EXACT ® Grade | Melt Index (g/10 min) | Density (g/cm³) |
| --- | --- | --- |
| 0201 | 1.1 | 0.902 |
| 3125 | 1.2 | 0.910 |
| 3128 | 1.2 | 0.900 |
| 3132 | 1.2 | 0.900 |
| 4056 | 2.2 | 0.883 |
| 4151 | 2.2 | 0.895 |
| 9090 | 1.2 | 0.902 |
| 9103 | 2.0 | 0.902 |
| 9107 | 1.2 | 0.912 |
| 0201HS | 1.1 | 0.902 |
| 0203 | 3.0 | 0.902 |
| 3024 | 4.5 | 0.905 |
| 3027 | 3.5 | 0.900 |
| 3131 | 3.5 | 0.900 |
| 3139 | 7.5 | 0.900 |
| 4011 | 2.2 | 0.888 |
| 4044 | 16.5 | 0.895 |
| 4053 | 2.2 | 0.888 |
| 4150 | 3.5 | 0.895 |
| 4151 | 2.2 | 0.895 |
| 3040 | 16.5 | 0.900 |
| 4044 | 16.5 | 0.895 |
| 4011 | 2.2 | 0.888 |
| 4049 | 4.5 | 0.873 |
| 4053 | 2.2 | 0.888 |
| 4056 | 2.2 | 0.883 |
| 0201 | 1.1 | 0.902 |
| 0203 | 3.0 | 0.902 |
| 3035 | 3.5 | 0.900 |
| 4011 | 2.2 | 0.888 |
| 4033 | 0.8 | 0.880 |
| 4041 | 3.0 | 0.878 |
| 4053 | 2.2 | 0.888 |
| 8201 | 1.1 | 0.882 |
| 9106 | 2.0 | 0.900 |
| 9108 | 1.2 | 0.900 |
| 4023 | 35 | 0.882 |
| 4049 | 4.5 | 0.873 |
| 3017 | 27 | 0.901 |
| 3022 | 9.0 | 0.905 |
| 4006 | 10.0 | 0.880 |

One particularly preferred EXACT® metallocene catalyzed polyolefin for use in a core composition is designated as EXACT® 4049. EXACT® 4049 is an ethylene-based butene plastomer produced by a particular metallocene having the EXXPOL® trademark designation. EXACT® 4049 has advantageous properties including excellent elastic recovery, low modulus, improved toughness and impact strength. Table 2 below discloses some of the properties of EXACT® 4049:

TABLE 2

|  | Test | Units (SI) | Typical Values[1] |
|---|---|---|---|
| Resin Properties |  |  |  |
| Melt Index | ASTM ® D-1238 | g/10 min | 4.5 |
| Melt Flow Rate | ASTM ® D-1238 | g/10 min | 7.8 |
| Density | ExxonMobil Method | g/cm$^3$ | 0.873 |
| Hardness[1], 15 sec Shore A | ASTM ® D-2240 |  | 72 |
| Shore D |  |  | 20 |
| Elastomeric Properties[2] |  |  |  |
| Mooney Viscosity 125° C. ML (1 + 4) | ASTM ® D-1646 | Torque Units | 6.5 |
| Tensile Stress[3] @ 100% Elongation | ASTM ® D-412 | psi (MPa) | 280 (2.0) |
| @ 300% Elongation | ASTM ® D-412 |  | 350 (2.4) |
| Tensile Strength @ Break | ASTM ® D-412 | psi (MPa) | 900 (6.4) |
| Elongation @ Break | ASTM ® D-412 | % | 2000 |
| Thermal Properties |  |  |  |
| Peak Melting Temperature | ExxonMobil Method | ° F. (° C.) | 131 (55) |
| Vicat Softening Point, 200 g | ExxonMobil Method | ° F. (° C.) | 130 (55) |
| Brittleness Temperature | ASTM ® D-746 | ° F. (° C.) | <-112 (<-80) |

[1]Values are typical and should not be interpreted as specifications.
[2]Physical properties were measured on compression molded specimens.
[3]Elastomeric tensile properties determined using specifications cut with a Type D die and a crosshead speed of 20 in/min.

ENGAGE® polyolefins from DuPont Dow Elastomers LLC are metallocene catalyzed and provide numerous structural and processing advantages over conventional polyolefins. Table 3 below discloses different grades of ENGAGE® polyolefins currently available.

magnesium oxide, zirconium oxide, and metal stearates including zinc stearate, calcium stearate, barium stearate, lithium stearate, magnesium stearate.

The metallocene catalyzed polyolefins can be injection molded or compression molded in order to form the core.

TABLE 3

| ENGAGE ® Grade | Density (g/cm$^3$) ASTM ® D-792 | Mooney Viscosity ML 1 + 4 at 121° C. ASTM ® D-1646 | Melt Flow Index (dg/min) ASTM ® D-1238 | Hardness Shore: A ASTM ® D-2240 | DSC Melting Peak (° C.) Rate 10° C./min | ASTM ® D-638M-90, 50 mm/min | |
|---|---|---|---|---|---|---|---|
|  |  |  |  |  |  | Ultimate Tensile Strength (MPa) | Ultimate Elongation (%) |
| 8180 | 0.863 | 35 | 0.5 | 66 | 49 | 10.1 | 800 |
| 8150 | 0.868 | 35 | 0.5 | 75 | 55 | 15.4 | 750 |
| 8100 | 0.870 | 23 | 1.0 | 75 | 60 | 16.3 | 750 |
| 8840* | 0.868 | 35 | 0.5 | 75 | 55 | 15.4 | 750 |
| 8200 | 0.870 | 8 | 5.0 | 75 | 60 | 9.3 | >1000 |
| 8400 | 0.870 | 1.5 | 30 | 72 | 60 | 4.1 | >1000 |
| 8452 | 0.875 | 11 | 3.0 | 79 | 67 | 17.5 | >1000 |
| 8411 | 0.880 | 3 | 18 | 76 | 78 | 10.6 | 1000 |
| 8003 | 0.885 | 22 | 1.0 | 86 | 76 | 30.3 | 700 |
| 8585 | 0.885 | 12 | 2.5 | 86 | 76 | 25.5 | 800 |
| 8401 | 0.885 | 1.5 | 30 | 85 | 76 | 10.8 | >1000 |
| 8440 | 0.897 | 16 | 1.6 | 92 | 95 | 32.6 | 710 |
| 8480 | 0.902 | 18 | 1.0 | 95 | 100 | 35.3 | 750 |
| 8450 | 0.902 | 10 | 3.0 | 94 | 98 | 30.7 | 750 |
| 8550 | 0.902 | 7 | 4.3 | 94 | 98 | 30.4 | 800 |
| 8402 | 0.902 | 1.5 | 30 | 94 | 100 | 14.1 | 940 |
| 8540 | 0.908 | 18 | 1.0 | 94 | 103 | 33.8 | 700 |
| 8445 | 0.910 | 8 | 3.5 | 94 | 103 | 27.9 | 750 |
| 8403 | 0.913 | 1.5 | 30 | 96 | 107 | 13.7 | 700 |

*Testing is done on base polymer before the addition of talc.
NOTE:
Other grades of ethylene copolymers are under development which have not yet commercialized under the ENGAGE ® designation.

The metallocene catalyzed polyolefin core may further comprise a heavy weight filler. Heavy weight fillers for use with metallocene catalyzed polyolefins include titanium, tungsten, aluminum, bismuth, nickel, molybdenum, iron, steel, lead, copper, brass, boron, boron carbide whiskers, bronze, cobalt, beryllium, zinc, tin, metal oxides including zinc oxide, iron oxide, aluminum oxide, titanium oxide, In producing solid golf ball cores utilizing the present compositions, the ingredients may be intimately mixed using, for example, two roll mills or an internal mixer, until the composition is uniform, usually over a period of from about 5 to about 20 minutes. The sequence of addition of components is not critical. A preferred blending sequence is as follows.

The elastomer, polypropylene powder resin (if desired), fillers, zinc salt, metal oxide, fatty acid, and the metallic dithiocarbamate (if desired), surfactant (if desired), and tin difatty acid (if desired), are blended for about 7 minutes in an internal mixer such as a BANBURY® (Farrel Corp.) mixer. As a result of shear during mixing, the temperature rises to about 200° F. The initiator and diisocyanate are then added and the mixing continued until the temperature reaches about 220° F. whereupon the batch is discharged onto a two roll mill, mixed for about one minute and sheeted out.

The sheet is rolled into a "pig" and then placed in a Barwell preformer and slugs are produced. The slugs are then subjected to compression molding at about 320° F. for about 14 minutes. After molding, the molded cores are cooled, the cooling effected at room temperature for about 4 hours or in cold water for about one hour. The molded cores can be subjected to a centerless grinding operation whereby a thin layer of the molded core is removed to produce a round core having a diameter of 1.2 to 1.5 inches. Alternatively, the cores are used in the as-molded state with no grinding needed to achieve roundness.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and the surface thereof optionally is treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel.

In addition to using solid molded cores, wound cores may also be incorporated in the golf balls of the present invention. Such wound covers would include a generally spherical center and a rubber thread layer, or windings, enclosing the outer surface of the center.

In this regard, the generally spherical center of the wound cores may be a solid center or a liquid center. The solid center can consist of one or more layers. For example, the solid center can comprise a molded polybutadiene rubber sphere which, although smaller in size, is of similar construction to the molded cores in the two-piece molded golf balls described above.

Suitable solid centers used in the invention are not particularly limited to, but include those made of vulcanized rubber. Such solid centers may be prepared by adding to butadiene rubber additives such as vulcanizing agents, accelerators, activating agents, fillers, modifiers and aids and then subjecting the mixture to vulcanization and molding.

The solid center (whether of single unitary construction or of multi-layers) generally is from 1 to 1.5 inches in diameter, preferably 1.0625 to 1.42 inches, with a weight of 15 grams to 36 grams, preferably 16.5 to 30 grams.

Alternatively, a liquid center can be incorporated into the wound core of the present invention. The liquid center consists of a hollow spherical bag or sack of conventional vulcanized rubber filled with a liquid, paste or gel. Examples of such a liquid include water, glycerin, sugar-water solutions, corn-syrup, saline solutions, oils, etc. and/or combinations thereof. Examples of pastes can be produced by adding clay, sodium sulfate, barytes, barium sulfate to a minor amount of ethylene glycol in water. Examples of suitable gels include hydrogels, cellulose gels, water gels, etc. The specific gravity of the liquid, paste, and the gels are from 0.6 to 3. The bag or sack is, in general, from 0.05 to 0.150 inches in thickness, preferably 0.08 to 0.105 inches in thickness.

The liquid center generally is from 1 to 1.25 inches in diameter, preferably 1.0625 to 1.14 inches, with a weight of 5.5 to 25.5 grams, preferably 15 to 21 grams.

The wound core is formed by winding conventional thread rubber around the outer periphery of the solid or liquid center. The thread rubber may include, for example, those prepared by subjecting natural rubber, or a blend of natural rubber and polyisoprene rubber to vulcanization and molding. The winding process is under high tension to produce a threaded layer over the solid or liquid center. Conventional techniques may be employed in winding the thread rubber and known compositions may be used. Although the thread rubber is not limited with respect to specific gravity, dimension and gage, it usually has a specific gravity of 0.9 to 1.1, a width of 0.047 to 0.094 and a gage of 0.012 to 0.026.

The rubber thread layer has a radial thickness of 0.10 to 0.315 inches and comprises a wound core having an outer diameter of 1.52 to 1.63 inches. The overall weight of the wound core is 33 to 44 grams, preferably 35 to 39 grams.

Multi-Layer Covers

As indicated above, cover layers of the present invention golf ball preferably, but not necessarily, comprise an ionomer resin. High or low acid ionomers, or ionomer blends can be used. The high acid ionomers which may be suitable for use in formulating the cover compositions are ionic copolymers which are the metal, i.e., sodium, zinc, magnesium, lithium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are at least partially neutralized (i.e., approximately 10% to 100%, and preferably 30% to 70%) by the metal ions. Each of the high acid ionomer resins contains greater than about 16% by weight of a carboxylic acid, and preferably from about 17% to about 25% by weight of a carboxylic acid, and more preferably from about 18.5% to about 21.5% by weight of a carboxylic acid.

The high acid ionomeric resins available from the ExxonMobil Corporation under the designation "IOTEK®", are somewhat similar to the high acid ionomeric resins available under the "SURLYN®" trademark. However, since the IOTEK® ionomeric resins are sodium, lithium or zinc salts of poly(ethylene-acrylic acid) and the SURLYN® resins are zinc, sodium, lithium, etc. salts of poly(ethylene-methacrylic acid), distinct differences in properties exist.

Non-limiting examples of the high acid methacrylic acid based ionomers suitable for use in accordance with this invention include SURLYN® 8140 (Na), 8220 (Na), 8240 (Na), 9120 (Zn), 9220 (Zn), AD8181 (Li), AD8530 (Zn), AD8531 (Na) and SEP 671 (Li).

Examples of the high acid acrylic acid based ionomers suitable for use in the present invention also include IOTEK® high acid ethylene acrylic acid ionomers produced by the ExxonMobil Corporation such as 1001, 1002, 959, 960, 989, 990, 1003, 1004, 993, and 994. In this regard, IOTEK® 959 is a sodium ion neutralized ethylene-acrylic acid copolymer. According to the ExxonMobil Corporation, IOTEK® 959 and 960 contain from about 19.0 to about 21.0% by weight acrylic acid with approximately 30 to about 70 percent of the acid groups neutralized with sodium and zinc ions, respectively.

Furthermore, a number of additional ionomers neutralized to various extents by several different types of metal cations, such as by manganese, lithium, potassium, calcium and nickel cations, several new ionomers and/or ionomer blends besides sodium, zinc and magnesium high acid ionomers or ionomer blends are now available for golf ball cover production. In particular it has been found that these cation neutralized high acid ionomer blends produce inner cover layer compositions exhibiting enhanced hardness and resilience due to synergies which occur during processing. Consequently, the metal cation neutralized high acid ionomer resins can be blended to produce substantially higher C.O.R.'s than those produced by the low acid ionomer inner cover compositions.

More particularly, the metal cation neutralized high acid ionomer resins are produced by neutralizing, to various extents, high acid copolymers of an alpha-olefin and an alpha, beta-unsaturated carboxylic acid with a wide variety of different metal cation salts. These metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. As indicated above, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the inner cover layer for the golf ball of the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Co., Midland, Mich., under the PRIMACOR® designation.

PRIMACOR® 5981 is the more preferred grade utilized in the present invention due to the high molecular weight of this grade of ethylene-acrylic acid copolymer.

The metal cation salts utilized in the present invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, and magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F., under high shear conditions at a pressure of from about 10 psi to 10,000 psi. Other blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

When the acid groups of copolymers of acrylic acid and ethylene sold by The Dow Chemical Co. (Midland, Mich.) and designated as PRIMACOR® 5981 were neutralized to various weight percentages using a number of different cations, a number of different high acid ionomer resins were produced. Due to differences in the nature of the cation salts, the amount of cation salts utilized, etc., the new high acid ionomer resins produced differed substantially in the extent of neutralization and in melt indices, as well as in resilience (i.e. C.O.R.) and hardness values.

For the purpose of determining the weight percent of neutralization of the carboxylic acid groups in the acrylic acid/ethylene copolymer after reacting with various cation salts, it was assumed that one mole of sodium ($Na^+$), potassium ($K^+$), and lithium ($Li^+$) neutralized one mole of acrylic acid, and that one mole of zinc ($Zn^{2+}$), magnesium ($Mg^{2+}$), manganese ($Mn^{2+}$), calcium ($Ca^{2+}$) and nickel ($Ni^{2+}$) neutralized two moles of acrylic acid. The calculations of neutralization were based upon an acrylic acid molecular weight of 79 g/mol, giving 0.2778 moles per 100 grams of copolymer.

The various cation salts were added in variable amounts to the 20 weight percent acrylic acid/ethylene copolymer in order to determine the optimal level of neutralization for each of the cations. All of these cation salts are solids at room temperature.

The specific cation salts were added in differing amounts with the 20 weight percent acrylic acid/ethylene copolymer (i.e. the PRIMACOR® 5981) to an internal mixer (BANBURY® type) for the neutralization reaction. The only exception was calcium acetate, which, due to problems encountered in solid form, was added as a 30 wt % solution in water.

In the neutralization reaction, the cation salts solubilized in the PRIMACOR® 5981 acrylic acid/ethylene copolymer above the melting point of the copolymer and a vigorous reaction took place with a great deal of foaming occurring as the cation reacted with the carboxylic acid groups of the acrylic acid/ethylene copolymer and the volatile by-products of water (in the case of oxides or hydroxides) or acetic acid (when acetates are used) were evaporated. The reaction was continued until foaming ceased (i.e. about 30–45 minutes at 250 to 350° F.), and the batch was removed from the BANBURY® mixer. Mixing of the batch obtained from the mixer continued on a hot two-roll mill (175 to 250° F.) to complete the neutralization reaction. The extent of the reaction was monitored by measuring melt flow index according to ASTM® D-1238-E. The neutralized products exhibited different properties depending upon the nature and amount of the cation salts utilized.

When compared to low acid versions of similar cation neutralized ionomer resins, the metal cation neutralized high acid ionomer resins exhibit enhanced hardness, modulus and resilience characteristics. These are properties that are particularly desirable in a number of thermoplastic fields, including the field of golf ball manufacturing.

As will be further noted in the Examples below, either or both high and low acid ionomer resins may be used in the cover compositions so long as the molded cover layers have a Shore D hardness of 60 or more, and more preferably 62 or more.

For example, one or more low acid (i.e. 16 weight % and/or less) hard ionomers may be included in the present invention. The hard (high modulus) ionomers suitable for use in the present invention include those ionomers having a hardness greater than 50 on the Shore D scale as measured in accordance with ASTM® method D-2240, and a flexural modulus from about 15,000 to about 70,000 psi as measured in accordance with ASTM® method D-790.

The hard ionomer resins utilized to produce the cover compositions are ionic copolymers which are the sodium, zinc, magnesium or lithium salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

Preferably, the hard ionomeric resins are copolymers of ethylene and either acrylic and/or methacrylic acid, with copolymers of ethylene and acrylic acid the most preferred. In addition, two or more types of hard ionomeric resins may be blended into the cover compositions in order to produce the desired properties of the resulting golf balls.

Examples of commercially available hard ionomeric resins which may be utilized in the present invention include the hard sodium ionic copolymer sold under the trademark "SURLYN® 8940" and the hard zinc ionic copolymer sold under the trademark "SURLYN® 9910". SURLYN®0 8940 is a copolymer of ethylene with methacrylic acid with about 15 weight percent acid which is about 29% neutralized with sodium ions. This resin has an average melt flow index of about 2.8. SURLYN® 9910 is a copolymer of ethylene and methacrylic acid with about 15 weight percent acid which is about 58% neutralized with zinc ions. The average melt flow index of SURLYN® 9910 is about 0.7.

In addition, examples of the more pertinent acrylic acid based hard ionomer resins suitable for use in the present invention sold under the IOTEK® tradename by the ExxonMobil Corporation include IOTEK® 4000 (formerly ESCOR® 4000), IOTEK® 4010, IOTEK® 8000 (formerly ESCOR® 900), IOTEK® 8020, IOTEK® 8030, IOTEK® 7010, IOTEK® 7020, and IOTEK® 7030.

In addition to the above, non-ionomeric materials can also be blended with the ionomers, or used separately, to produce the cover layer of the invention. Non-limiting examples of materials that can be utilized include ethylene-ethyl acrylate, ethylene-methyl acrylate, ethylene-vinyl acetate, low density polyethylene, linear low density polyethylene, metallocene catalyzed polyolefins such as ENGAGE® polyolefins available from DuPont Dow Elastomers LLC and EXACT® polyolefins available from ExxonMobil Corporation, non-ionomeric acid copolymers such as PRIMACOR®, available from The Dow Chemical Co., and NUCREL®, available from E.I. DuPont De Demours & Co., and a variety of thermoplastic elastomers, including KRATON®, available from the Shell Oil Co., SANTOPRENE®, available from the Monsanto Co., and HYTREL®, available from DuPont, etc. Furthermore, functionalized EPDM, such as maleated EPDM, nylon, and nylon-ionomer graft copolymers may be utilized.

A wide array of nylon-containing or nylon-based materials may be incorporated into the various cover layers of the present invention golf ball. Preferred nylon materials for utilizing in the present invention golf ball are described in U.S. Pat. No. 5,886,103 herein incorporated by reference.

In order to visibly distinguish the layers, a wide variety of agents such as phosphorous, florescent dies, florescent pigments, etc. can be used.

Additional materials may also be added to the cover (or inner and outer cover layers) of the present invention as long as they do not substantially reduce the playability properties of the ball. Such materials include dyes (for example, ULTRAMARINE BLUE® sold by Whitaker, Clark, and Daniels of South Plainsfield, N.J.) (see U.S. Pat. No. 4,679, 795); optical brighteners; pigments such as titanium dioxide, zinc oxide, barium sulfate and zinc sulfate; UV absorbers; antioxidants; antistatic agents; and stabilizers. Moreover, the cover compositions of the present invention may also contain softening agents such as those disclosed in U.S. Pat. Nos. 5,312,857 and 5,306,760, both of which are herein incorporated by reference, including plasticizers, metal stearates, processing acids, etc., as long as the desired properties produced by the golf ball covers of the invention are not impaired.

Moreover, since there are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials such as antioxidants (i.e. SANTONOX®), antistatic agents, stabilizers and processing aids. The cover compositions of the present invention may also contain softening agents, such as plasticizers, etc., and reinforcing materials such as glass fibers and inorganic fillers, as long as the desired properties produced by the golf ball covers of the invention are not impaired.

In one preferred form of the invention, the inner cover layer or inner cover layers contain filler materials. More particularly, filler materials are included in order to affect moment of inertia and spin of the golf ball, for example. Suitable filler materials for the inner cover layer or layers of the golf ball include, but are not limited to, clay, talc, asbestos, graphite, glass, mica, calcium metal silicate, barium sulfate, zinc sulfide, aluminum hydroxide, silicates, diatomaceous earth, carbonates such as calcium carbonate, magnesium carbonate and the like, metals such as titanium, tungsten, aluminum, bismuth, nickel, molybdenum, iron, copper, brass, boron, bronze, cobalt and beryllium, and alloys of the above metals, metal oxides such as zinc oxide, iron oxide, aluminum oxide, titanium oxide, magnesium oxide, zirconium oxide and the like, particulate synthetic plastic such as high molecular weight polyethylene, polystyrene, polyethylene ionomer resins and the like, particulate carbonaceous materials such as carbon black, natural bitumen and the like, as well as cotton flock, cellulose flock, and leather fiber.

Dark colored fillers generally are not preferred for use at the outer surface of the ball if a white ball is desired. Thus, a two-layer cover in which a non-white filler is only present in the inner cover layer can be employed.

The amount of filler employed is primarily a function of weight restrictions. For example, weight may be removed from the core and placed in the inner and/or outer cover. This added weight will change the moment of inertia of the ball thereby potentially altering performance. Whereas typically the specific gravity of the cover layer or layers is about 0.95–1.00, it may be desirable to increase the specific gravity of one or more of the cover layers to greater than 1.0, preferably 1.1–2.0.

Furthermore, optical brighteners, such as those disclosed in U.S. Pat. No. 4,679,795, herein incorporated by reference, may also be included in the cover composition of the invention. Examples of suitable optical brighteners which can be used in accordance with this invention are UVITEX® OB as sold by the Ciba-Geigy Chemical Company, Ardsley, N.Y. UVITEX® OB thought to be 2,5-Bis(5-tert-butyl-2-benzoxazoyl)-thiophene. Examples of other optical brighteners suitable for use in accordance with this invention include LEUCOPURE® EGM as sold by Clariant AG, East Hanover, N.J. 07936. (LEUCOPURE® EGM is believed to be 7-(2n-naphthol(1,2-d)-triazol-2yl-3-phenyl-coumarin)); PHORWHITE® K-20G2 as sold by Bayer Corporation, Union, N.J. 07083 (thought to be a pyrazoline derivative); and EASTOBRITE® OB-1 as available from Eastman Chemical Company (2,2'(1,2-ethenediyldi-4, 1-phenylene) bisbenzoxazole).

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01 % to about 0.5% as based on the weight of the polymer used as a cover stock. A more preferred range is from about 0.05% to about 0.25% with the most preferred range from about 0.10% to about 0.20% depending on the optical properties of the particular optical brightener used and the polymeric environment in which it is a part.

Generally, the additives are admixed with an ionomer to be used in the cover composition to provide a master batch (M.B.) of desired concentration, and an amount of the master batch sufficient to provide the desired amounts of additive is then admixed with the copolymer blends.

The above cover layer compositions, when combined with soft cores at the cover layer thicknesses described herein, produce golf balls having a relatively low spin in combination with good click and feel.

The cover compositions and molded balls of the present invention may be produced according to conventional melt blending procedures. In this regard, the ionomeric resins are blended along with the master batch containing the desired additives in a BANBURY® type mixer, two-roll mill, or extruded prior to molding. The blended composition is then formed into slabs or pellets, etc. and maintained in such a state until molding is desired. Alternatively a simple dry blend of the pelletized or granulated resins and color master batch may be prepared and fed directly into the injection molding machine where homogenization occurs in the mixing section of the barrel prior to injection into the mold. Additives such as the fillers, etc., are added and uniformly mixed before initiation of the molding process.

The golf balls of the present invention can be produced by molding processes currently well known in the golf ball art.

Specifically, the golf balls can be produced by conventional molding techniques, such as by injection molding or compression molding the novel cover compositions over the soft polybutadiene cores to produce a golf ball having a diameter of about 1.680 inches or greater, preferably at least 1.70 inches, and weighing about 1.620 ounces. Larger molds are utilized to produce the thicker covered oversized golf balls. For injection-molded cover layers having a thickness of up to about 3.0 mm, it may be preferable to mold the cover in a single step. For covers and for cover layers of 3.0 mm or more, it generally is preferable for reasons of both processability and uniformity to mold the cover in two layers. In compression molding, it may be appropriate to mold a thicker cover in a single layer. In compression molding, the cover composition is formed via injection at about 380° F. to about 450° F. into smooth surfaced hemispherical shells which are then positioned around the core in a dimpled golf ball mold and subjected to compression molding at 200 to 300° F. for 2 to 10 minutes, followed by cooling at 50 to about 70° F. for 2 to 10 minutes, to fuse the shells together to form an unitary ball. In addition, the golf balls may be produced by injection molding, wherein the cover composition is injected directly around the core placed in the center of a golf ball mold for a period of time at a mold temperature of from 50 to about 100° F. After molding the golf balls produced may undergo various further finishing steps such as flash trimming, priming, marking, finish coating and the like as is well known and is disclosed, for example in U.S. Pat. No. 4,911,451, herein incorporated by reference.

The present invention is further illustrated by the following examples in which the parts of the specific ingredients are by weight (pbw). It is to be understood that the present invention is not limited to the examples, and various changes and modifications may be made in the invention without departing from the spirit and scope thereof.

EXAMPLES

Example 1

Thick, Single Cover Oversize Balls

A number of golf ball cores having Formulation A, shown below, were prepared.

| Core Formulation A | |
|---|---|
| Material | Parts by Weight |
| SMR - CV 60[1] | 25.00 |
| TAKTENE ® 220[2] | 73.50 |
| HI-SIL ® 234 LD[3] | 6.00 |
| Zinc Oxide[4] | 5.00 |
| Barytes #22[5] | 80.00 |
| Stearic Acid[6] | 1.60 |
| AGERITE ® Superlite[7] | 1.60 |
| $TiO_2$ Rutile 2020[8] | 3.00 |
| Circolite Oil[9] | 5.00 |
| Red pigment[10] | 3.00 |
| Sulfur (insol)[11] | 3.14 |
| SANTOCURE ® N.S.[12] | 1.28 |
| Methyl Zimate[13] | 0.27 |
| D.P.G.[14] | 0.68 |
| | 206.07 |

[1]Natural rubber, Muehlstein, Norwalk, CT
[2]Synthetic polybutadiene, Bayer Corp., Akron, OH
[3]Precipitated hydrated silica, PPG Industries, Pittsburgh, PA
[4]Zinc Corp. of America, Monaca, PA
[5]Harwick Chemical, Akron, OH
[6]Harwick Chemical, Akron, OH -continued Core Formulation A

| Material | Parts by Weight |
|---|---|
| [7]R. T. Vanderbilt, Norwalk, CT | |
| [8]Harwick Chemical, Akron, OH | |
| [9]Sun Oil, Philadelphia, PA | |
| [10]Stauffer Chemical, Westport, CT | |
| [11]Stauffer Chemical, Westport, CT | |
| [12]R. T. Vanderbilt, Norwalk, CT | |
| [13]R. T. Vanderbilt, Norwalk, CT | |
| [14]1,3-Diphenylguanidine (accelerator) R. T. Vanderbilt, Norwalk, CT | |

One to two dozen cores were made having an average diameter of 36.3 mm (1.430 inches) (Example 1-1). One to two dozen cores having an average diameter of 37.3 mm (1.470 inches) also were made (Example 1-2). The cores were cured at 320° F. for 12 minutes, followed by six minutes of cooling using cold water.

The cores were covered with a thick, single layer of an ionomeric cover material to produce an unfinished golf ball 43.7 mm (1.72 inches) in diameter. The ionomeric cover material consisted of Cover Formulation W, shown below:

Cover Formulation W

| | Parts by weight | White Master batch - | Parts by weight |
|---|---|---|---|
| IOTEK ® 8000 | 70.6 | IOTEK ® 7030 | 100 |
| IOTEK ® 7010 | 19.9 | UNITANE ® 0-110 | 31.72 |
| White Master Batch | 9.5 | ULTRAMARINE BLUE ® | 0.6 |
| | | EASTOBRITE ® OB-1 | 0.35 |
| | | SANTONOX ® R | 0.05 |

As shown in Table 4 below, the golf balls with a 36.3 mm average core diameter had an overall average weight of 43.5 grams, an average cover thickness of 3.68 mm (0.145 inches), an average PGA compression of 78, and an average coefficient of restitution (C.O.R.) of 0.744 (Example 1-1). The golf balls with 37.3 mm (1.470 inch) average core diameters had an average weight of 44.4 grams, an average cover thickness of 3.18 mm (0.125 inches), an average PGA compression of 48, and an average coefficient of restitution of 0.732 (Example 1-2). These thick covered, two piece oversized golf balls have excellent feel due to the combination of a hard cover and a very soft core, and could be used (due to their low average C.O.R.'s) as restricted flight golf balls.

A number of golf ball cores having Core Formulation B, shown below, were formed.

Core Formulation B

| Material | Parts by Weight |
|---|---|
| CARIFLEX ® BR-1220[1] | 67.35 |
| TAKTENE ® 220[2] | 27.50 |
| NATSYN ® 2200[3] | 5.15 |
| Zinc Oxide[4] | 6.53 |
| Limestone[5] | 8.25 |
| Poly Pro 20 Mesh[6] | 6.19 |
| Regrind[7] | 19.59 |

-continued

Core Formulation B

| Material | Parts by Weight |
|---|---|
| Zinc Stearate[8] | 14.78 |
| Zinc Diacrylate[9] | 19.24 |
| LUPERSOL ® 230XL or TRIGANOX ® 17/40[10] | 1.48 |

[1]Polybutadiene Muehlstein, Norwalk, CT
[2]Synthetic Polybutadiene Bayer Corp., Akron OH (internal source)
[3]Natural Rubber Muehlstein, Norwalk, CT
[4]Zinc Corp of America, Monaca, PA
[5]Lee Lime, Lee, MA
[6]Amoco Chemical,
[7]golf ball core regrind
[8]Synpro, Cleveland, OH
[9]Rockland React Rite, Rockland, GA
[10]Peroxide, R. T. Vanderbilt, Norwalk, CT The cores were cured for 15 minutes at 310° F. followed by 7 minutes of cooling using cooling water. Cores having average diameters of 36.3 mm (1.430 inches) (Example 1-4) and of 37.3 mm (1.470 inches) were formed (Example 1-3).

Cores having an average diameter of 39.2 mm (1.545 inches) also were formed (Example 1-C1) as a control. These cores are representative of the size of cores in standard size, oversized golf balls.

The cores of Examples 1-3, 1-4 and 1-C1 were covered with a single layer of the same ionomeric cover material as was used in Examples 1-1 and 1-2. The 36.3 mm and 37.3 mm diameter cores resulted in thick covered, oversized golf balls having an overall diameter of 43.7 mm (1.72 inches) (Examples 1-3 and 1-4). Similarly, the 39.2 mm cores were used to form golf balls having a diameter of 43.8 mm (1.725 inches) (Example 1-C1).

The golf balls made from 36.3 mm cores (Example 1-4) had a final weight of 44.5 grams, a cover thickness of 3.68 mm (0.145 inches), a PGA compression of 112 and a coefficient of restitution of 0.811. The balls made from 37.3 mm cores (Example 1-3) had a weight of 45.1 grams, a cover thickness of 3.18 mm (0.124 inches), a PGA compression of 105, and a coefficient of restitution of 0.809. The normal cover thickness control balls having 39.2 mm cores (Example 1-C1) had an overall weight of 46.0 grams, a cover thickness of 2.29 mm (0.090 inches), a PGA compression of 93, and a coefficient of restitution of 0.812.

Example 2

Thick Covered Multi-Layer Golf Balls, Standard Size

A number of 32.8 mm (1.29 inch) average diameter golf ball cores were made using Core Formulation C, shown below. The curing process was the same as the sulfur curing process described above in Example 1. The cores were used to make four different types of golf balls having the cover compositions and thicknesses shown in Table 4 as Examples 2-1 to 2-4. The IOTEK® 959/960 cover formulation (Cover Formulation X utilized) also is shown below.

| Core Formulation C | | Cover Formulation X | |
|---|---|---|---|
| | Parts by Weight | | Parts by Weight |
| CARIFLEX ® BR 1220 | 80 | IOTEK ® 959 | 45.3 |
| SMR CV 60 | 20 | IOTEK ® 960 | 45.3 |

-continued

| Core Formulation C | Parts by Weight |
|---|---|
| Zinc Oxide | 5 |
| Limestone | 110 |
| Stearic Acid | 1.6 |
| AGERITE ® Superlite | 1.6 |
| Circolite Oil | 5 |
| Sulfur | 3.14 |
| SANTOCURE ® N.S. | 1.28 |
| Methyl Zimate | 0.28 |
| D.P.G. | 0.68 |
|  | 228.58 |

| Cover Formulation X | Parts by Weight |
|---|---|
| White Master Batch (see formulation in Ex. 1) | 9.4 |

The resulting average PGA compression and coefficient of restitution of the golf balls also is shown in Table 4. A control example using a standard size, two piece ball core, i.e. 39.2 mm (1.545 inch) core, having Core Formulation I, shown below, and a single cover layer with a thickness of 1.78 mm (0.070 inches) also was formed. The physical properties of the resulting balls are shown in Table 4 as 2-C1.

| Core Formulation I | Parts by Weight |
|---|---|
| CARIFLEX ® BR-1220 | 70.80 |
| TAKTENE ® 220 | 29.20 |
| Zinc Oxide | 6.93 |
| Limestone | 18.98 |
| Poly Pro 20 Mesh | 2.55 |
| Regrind | 20.07 |
| Zinc Stearate | 20.07 |
| ZDA | 30.29 |
| Blue Master Batch | 0.01 |
| LUPERCO ® 231-XL or TRIGANOX ® 29/40[2] | 0.90 |

[2] peroxide, R. T. Vanderbilt, Norwalk, CT

The very thick covered balls (2-1 to 2-4) had the same, or substantially the same, overall compression (i.e. 105–116 PGA) as the thin covered control (i.e., 2-C1, 105 PGA) even though the thick covers were more than double, and in some instances nearly triple, the thickness of the control.

Example 3

Thick Covered Multi-Layer Balls, Standard Size

A number of sulfur-cured golf ball cores having an average diameter of 32.5 mm (1.28 inches) and the formulation shown below were formed:

| Core Formulation D | |
|---|---|
| Materials | phr |
| CARIFLEX ® BR-1220 | 80 |
| SMR CV-60 | 20 |
| Zinc Oxide | 5 |
| Limestone | 20 |
| Stearic Acid | 1.6 |
| Circolite oil | 5 |
| Sulfur | 3.14 |
| SANTOCURE ® N.S. | 1.28 |

-continued

| Core Formulation D | |
|---|---|
| Materials | phr |
| Methyl Zimate | 0.28 |
| D.P.G. | 0.68 |
| AGERITE ® White[1] | 0.8 |

[1] R. T. Vanderbilt, Norwalk, CT

The cores were cured for 12 minutes at 320° F., followed by cooling for six minutes with cooling water. The sulfur-cured cores (Examples 3-3, 3-4, 3-7 and 3-8) had an average surface Shore A hardness of 71, an average surface Shore C hardness of 35 and an average surface Shore D hardness of 21.

A number of peroxide-cured cores having an average diameter of 32.5 mm (1.28 inches) and Core Formulation B, shown above were formed. The cores were cured for 15 minutes at 310° F., followed by cooling for seven minutes using cooling water. The cores (Examples 3-1, 3-2, 3-5 and 3-6) had the PGA compression and C.O.R. values shown in Table 4.

A number of standard size "control" cores were made having a diameter of 39.2 mm (1.545 inches) and having Core Formulation F, shown below, were formed (Examples 3-C1 and 3-C2).

| Core Formulation F | Parts by Weight |
|---|---|
| CARIFLEX ® BR-1220 | 70.37 |
| TAKTENE ® 220 | 29.63 |
| Zinc Oxide | 6.67 |
| Limestone | 24.07 |
| Poly Pro 20 Mesh | 8.89 |
| Regrind | 17.04 |
| Zinc Stearate | 18.52 |
| Zinc Diacrylate | 27.41 |
| LUPERCO ® 231-XL or TRIGANOX ® 17/40 | 0.9 |

Furthermore, a number of "control" cores having a diameter of 39.2 mm (1.545 inches) and having Core Formulation G, shown below, were formed (Examples 3-C3 and 3-C4).

| Core Formulation G | Parts by Weight |
|---|---|
| CARIFLEX ® BR-1220 | 73.33 |
| TAKTENE ® 220 | 26.67 |
| Zinc Oxide | 22.33 |
| Regrind | 10 |
| Zinc Stearate | 20 |
| Zinc Diacrylate | 26 |
| LUPERCO ® 231-XL or TRIGANOX ® 17/40 | 0.9 |

The 32.5 mm cores were covered with a thick multi-layer cover, i.e. 3.35 mm (0.132 inch) thick layer of ionomer followed by a 1.78 mm (0.070 inch) thick layer of the same or a different ionomer. The covers had a "422 tri" dimple pattern, which is the same dimple pattern as is used on the TOP-FLITE® Hot XL (1995), tour trajectory ball. The compression and coefficient of the cores, balls having the first cover layer, and balls having the second cover layer, as well as the finished balls, were obtained and are shown in Table 4. The control cores were covered with a single layer of ionomer having a thickness of 1.78 mm (0.070 inches).

The results demonstrate that thick covered multi-layer golf balls can be produced having comparable compression and C.O.R. values to existing multi-layer golf balls.

Example 4

A number of thermoplastic golf ball cores containing 100 parts by weight EXACT® 4049 (ExxonMobil Chemical Co.), a metallocene catalyzed polyolefin, and 60 parts by weight of tungsten powder were formed (Core Formulation H, Examples 4-1, 4-2, 4-5 and 4-6). The cores were cured for 5 minutes at 320° F. followed by cooling using cooling water for 7 minutes. The cores had an average weight of 23.3 grams and an average diameter of 32.5 mm (1.28 inches). The cores were covered with a 3.35 mm (0.132 inch) thick layer of ionomer, followed by a second cover having a thickness of about 1.78 mm (0.070 inches). The inner and outer cover layers had the formulations Y and Z as shown in Table 4. Cover formulations Y and Z are as follows:

Cover Formulation Y

|  | Parts by Weight |
|---|---|
| IOTEK® 1002 | 45.3 |
| IOTEK® 1003 | 45.3 |
| White Master Batch (see formulation in Ex. 1) | 9.4 |

Cover Formulation Z

|  | Parts by Weight |
|---|---|
| IOTEK® 8000 | 70.6 |
| IOTEK® 7010 | 19.9 |
| White Master Batch (see formulation in Ex. 1) | 9.5 |

Also, crosslinked cores were made using 100 parts by weight of EXACT® 4049, 60 parts by weight of tungsten powder and 5 parts by weight TRIGONOX® 17/40 (Core Formulation J, Examples 4-3, 4-4 and 4-7). The cores were cured for 14 minutes at 320° F. followed by cooling with cooling water for 7 minutes. The cores had a weight of 23.6 grams. The cores had a diameter of 32.5 mm (1.28 inches), and were covered with the same types and thicknesses of cover materials as were used for the thermoplastic cores. The cover materials are shown in Table 9. The outer covers of Example 4 employed a "422 Hex" dimple pattern, which is the same dimple pattern as is used on the TOP-FLITE® XL (1996), regular trajectory ball.

The compression and coefficient values for the balls having a single cover layer, both cover layers, and finished products were determined and are shown in Table 4. As shown by the results, the thick covered balls, having metallocene catalyzed polyolefin cores, give relatively soft compression versus the thick covered balls having polybutadiene cores, and demonstrate the variety of properties which are possible with the novel constructions of the invention. The balls of this Example which have cores made of metallocene catalyzed polyolefin would be useful as range or practice balls, as they have a soft feel and high spin, as well as a very durable, hard cover.

TABLE 4

|  |  | CORE |  |  | INNER COVER |  |  |  |
|---|---|---|---|---|---|---|---|---|
| EX. # | Type[1] | Size mm | PGA Comp | C.O.R. (×1000) | Type[2] | Thickness mm | PGA Comp | C.O.R. (×1000) |
| 1-1 | A | 38.32 | — | — |  |  | — | — |
| 1-2 | A | 37.34 | — | — |  |  | — | — |
| 1-3 | B | 37.34 | — | — |  |  | — | — |
| 1-4 | B | 36.32 | — | — |  |  | — | — |
| 1-C1 | B | 39.24 | — | — |  |  | — | — |
| 2-1 | C | 32.77 | — | — | W | 3.18 | — | — |
| 2-2 | C | 32.77 | — | — | W | 3.56 | — | — |
| 2-3 | C | 32.77 | — | — | X | 3.18 | — | — |
| 2-4 | C | 32.77 | — | — | X | 3.56 | — | — |
| 2-C1 | I | 39.24 | — | — | — | — | — | — |
| 3-1 | B | 32.51 | 71.00 | 759.00 | X | 3.35 | 115 | 786 |
| 3-2 | B | 32.51 | 71.00 | 759.00 | X | 3.35 | 115 | 786 |
| 3-3 | D | 32.51 |  |  | X | 3.35 | 75 | 768 |
| 3-4 | D | 32.51 |  |  | X | 3.35 | 75 | 768 |
| 3-5 | B | 32.51 | 71.00 | 759.00 | W | 3.35 | 110 | 772 |
| 3-6 | B | 32.51 | 71.00 | 759.00 | W | 3.35 | 110 | 772 |
| 3-7 | D | 32.51 |  |  | W | 3.35 | 69 | 749 |
| 3-8 | D | 32.51 |  |  | W | 3.35 | 69 | 749 |
| 3-C1 | F | 39.24 | 98.00 | 762.00 | — | — | — | — |
| 3-C2 | F | 39.24 | 98.00 | 762.00 | — | — | — | — |
| 3-C3 | G | 39.24 | 87.00 | 767.00 | — | — | — | — |
| 3-C4 | G | 39.24 | 87.00 | 767.00 | — | — | — | — |
| 4-1 | H | 32.51 |  |  | Y | 3.35 | 79 | 731 |
| 4-2 | H | 32.51 |  |  | Z | 3.35 | 77 | 737 |
| 4-3 | J | 32.51 |  |  | Y | 3.35 | 80 | 740 |
| 4-4 | J | 32.51 |  |  | Z | 3.35 | 78 | 741 |
| 4-5 | H | 32.51 |  |  | Y | 3.35 | 79 | 731 |
| 4-6 | H | 32.51 |  |  | Z | 3.35 | 77 | 737 |
| 4-7 | J | 32.51 |  |  | Z | 3.35 | 78 | 741 |

TABLE 4-continued

| EX. # | Type[2] | OUTER COVER | | | FINISHED BALL | | | SPIN |
|---|---|---|---|---|---|---|---|---|
| | | Thickness mm | PGA Comp | C.O.R. (×1000) | Weight (g) | PGA Comp | C.O.R. (×1000) | Revs/min |
| 1-1 | W | 3.68 | — | — | 43.50 | 78 | 744 | — |
| 1-2 | W | 3.18 | — | — | 44.40 | 48 | 732 | — |
| 1-3 | W | 3.18 | — | — | 45.10 | 105 | 809 | — |
| 1-4 | W | 3.68 | — | — | 44.50 | 112 | 811 | — |
| 1-C1 | W | 2.29 | — | — | 46.00 | 93 | 812 | — |
| 2-1 | W | 1.78 | — | — | | 106 | 753 | — |
| 2-2 | W | 1.40 | — | — | | 105 | 752 | — |
| 2-3 | X | 1.78 | — | — | | 116 | 746 | — |
| 2-4 | X | 1.40 | — | — | | 114 | 770 | — |
| 2-C1 | W | 1.78 | — | — | | 105 | 803 | — |
| 3-1 | X | 1.78 | 122 | 791 | | 130 | 806 | 6314 |
| 3-2 | W | 1.78 | 118 | 778 | | 126 | 796 | 6095 |
| 3-3 | X | 1.78 | 110 | 769 | | 117 | 790 | — |
| 3-4 | W | 1.78 | 102 | 764 | | 114 | 778 | — |
| 3-5 | X | 1.78 | 120 | 786 | | 128 | 801 | — |
| 3-6 | W | 1.78 | 118 | 775 | | 126 | 791 | — |
| 3-7 | X | 1.78 | 108 | 771 | | 116 | 776 | 7999 |
| 3-8 | W | 1.78 | 102 | 756 | | 111 | 764 | — |
| 3-C1 | X | 1.78 | 105 | 790 | | 108 | 797 | — |
| 3-C2 | W | 1.78 | 102 | 789 | | 106 | 791 | — |
| 3-C3 | X | 1.78 | 98. | 800 | | 102 | 807 | — |
| 3-C4 | W | 1.78 | 95. | 789 | | 100 | 799 | — |
| 4-1 | Y | 1.78 | 103 | 742 | 45.40 | 106 | 749 | 8497 |
| 4-2 | Y | 1.78 | 101 | 746 | 45.30 | 105 | 753 | 8081 |
| 4-3 | Y | 1.78 | 105 | 757 | 46.00 | 107 | 763 | 8337 |
| 4-4 | Y | 1.78 | 103 | 759 | 46.20 | 105 | 763 | 8642 |
| 4-5 | Z | 1.78 | 102 | 736 | 45.40 | 105 | 743 | 8226 |
| 4-6 | Z | 1.78 | 99 | 747 | 45.20 | 103 | 751 | 8758 |
| 4-7 | Z | 1.78 | 99 | 751 | 45.90 | 104 | 759 | — |

[1]A = sulfur cured core of Ex. 1
B = polybutadiene peroxide cured core of Ex. 1 and Ex. 3-1, 3-2, 3-5 and 3-6
C = sulfur cured core of Ex. 2
D = sulfur cured core of Ex. 3-3 and 3-4
F = polybutadiene peroxide cured core of Ex. 3-C1 and 3-C2
G = polybutadiene peroxide cured core of Ex 3-C3 and 3-C4
H = thermoplastic EXACT° core of Ex. 4
I = blue core of Ex. 2
J = thermoset EXACT° core of Ex. 4
[2]W = IOTEK° 8000/7030 formulation of Ex. 1-3
X = IOTEK° 959/960 formulation of Ex. 2-3
Y = IOTEK° 1002/1003 formulation of Ex. 4
Z = IOTEK° 8000/7010 formulation of Ex. 4

Example 5A

The balls of Examples 3-1, 3-2, 3-7, and 4-1 to 4-6 were spin, tested under the following conditions:
MIYAMAE® Driving Machine
Club: TOP-FLITE® Custom 9 iron
Club Head Speed: 105 fps
The results are shown in Table 4 above.

The balls of Examples 3-1, 3-2, 3-7, 4-5 and 4-6 were distance tested and were compared with the 1995 TOP-FLITE® Hot XL golf balls. The distance test conditions are provided below:
Club Name: TOP-FLITE® Tour 10.5
Club Head Speed: 160 ft/sec
Launch Angle—degrees: 9.5
The distance test results are shown below in Table 5.

TABLE 5

| Ball | Traj deg. | Flight Time sec | Carry yds | Carry Diff yds | Ctr Dev[1] yds | Roll yds | Total Dist yds | Total Diff yds |
|---|---|---|---|---|---|---|---|---|
| 3-1 | 12.50 | 10.00 | 244.40 | 0.00 | −2.25 | 11.30 | 255.60 | 0.00 |
| 3-7 | 12.80 | 10.00 | 237.70 | −6.60 | −1.75 | 9.40 | 247.10 | −8.50 |
| 3-2 | 12.10 | 10.00 | 227.40 | −17.00 | −3.04 | 19.20 | 246.60 | −9.10 |
| 4-5 | 10.90 | 10.00 | 225.50 | −18.90 | −6.54 | 10.20 | 235.70 | −20.00 |
| 4-6 | 11.30 | 9.90 | 226.80 | −17.50 | −6.71 | 11.70 | 238.50 | −17.10 |
| Hot XL (1995) | 11.70 | 10.00 | 237.80 | −6.60 | −4.75 | 13.10 | 250.90 | −4.80 |

[1]Deviation from center

The longest ball is that of Example 3-1. This result is surprising, particularly in view of the fact that this ball has a C.O.R. of 0.806, while the 1995 TOP-FLITE® Hot XL ball has a C.O.R. of 0.812±0.003. The ball of Example 3-2 also had a surprisingly long total distance given its low C.O.R. of 0.796.

Example 5B

Distance tests were conducted for the balls of Examples 3-1, 3-2 and 4-1 to 4-4 under slightly different conditions, which were the following:

Club Name: TOP-FLITE® Tour 10.5

Club Head Speed: 155 ft/sec

Launch Angle—degrees: 9.6

The distance test results are shown below in Table 6.

TABLE 6

| Ball | Traj deg. | Flight Time sec | Carry yds | Carry Diff yds | Ctr Dev yds | Roll yds | Total Dist yds | Total Diff yds |
|---|---|---|---|---|---|---|---|---|
| 4-1 | 11.50 | 9.90 | 227.10 | −12.20 | 2.08 | 13.10 | 240.20 | −12.90 |
| 4-2 | 11.90 | 10.00 | 226.10 | −13.10 | 1.96 | 13.40 | 239.50 | −13.60 |
| 4-3 | 11.80 | 10.00 | 228.00 | −11.30 | 2.54 | 12.10 | 240.10 | −13.00 |
| 4-4 | 11.80 | 10.00 | 227.40 | −11.90 | 0.63 | 11.10 | 238.50 | −14.60 |
| 3-1 | 12.00 | 10.00 | 239.30 | 0.00 | 2.10 | 13.80 | 253.10 | 0.00 |
| 3-2 | 12.00 | 10.00 | 233.40 | −5.90 | 2.79 | 11.10 | 244.50 | −8.60 |
| Hot XL (1995) | 12.40 | 10.00 | 239.00 | −0.20 | 2.46 | 13.80 | 252.90 | −0.20 |

Once again, the ball of Example 3-1 is the longest. The ball of Example 3-2 again had a surprisingly long total distance given its low C.O.R.

Example 6

A number of standard size, control golf ball cores having an average diameter of 39.2 mm (1.545 inches) and a weight of 36.7g were formed using Core Formulation K, shown below.

| Core Formulation K | |
|---|---|
| | Parts by Weight |
| CARIFLEX ® 1220 | 70 |
| TAKTENE ® 220 | 30 |
| Zinc Oxide | 6.7 |
| Zinc Diacrylate | 27.4 |
| Zinc Stearate | 18.5 |
| Limestone | 24 |
| Poly Pro 20 Mesh | 8.9 |
| Regrind | 17 |
| TRIGANOX ® 17/40 | 0.9 |

The cores were cured for 11½ minutes at 320° F., and were then cooled using cooling water for about 7 minutes. The cores had a PGA compression of 95 and a C.O.R. of 0.770.

A number of golf ball cores having Core Formulation L (shown below) and average diameters of 34.8 mm (1.37 inches) and 39.9 mm (1.57 inches) were formed. The cores were cured for 12 minutes at 320° F., followed by cooling using cooling water for about 6 minutes.

| Core Formulation L | |
|---|---|
| | Parts by Weight |
| CARIFLEX ® 1220 | 100 |
| Stearic Acid | 2 |
| Zinc Oxide | 4 |
| Barytes | 52 |

-continued

| Core Formulation L | |
|---|---|
| | Parts by Weight |
| HI-SIL ® 233[1] | 7.5 |
| VANOX ® 1290[2] | 1 |
| Sulfur | 5.25 |
| Durax[3] | 1.75 |
| DOTG[4] | 1 |
| Bismate[5] | 2.8 |

[1]P.P.G. Industries
[2]R. T. Vanderbilt
[3]R. T. Vanderbilt
[4]R. T. Vanderbilt
[5]R. T. Vanderbilt The cores of control Examples 6-C1, 6-C2 and 6-C3 were covered with a single cover layer having a thickness of 1.78 mm (0.07 inches). The control cores were covered with the cover formulations shown in Table 4, which are the same as cover formulations W–Z in Examples 1-4. The cores of Examples 6-1 through 6-10 were covered with inner and outer covers having the cover formulations and thicknesses shown in Table 4. All of the balls of the present invention and the control balls were distance tested using a 5-iron at 128 feet per second and a driver at 160 feet per second.

As shown in Table 7, while the thick covered balls of the present invention had substantially lower coefficients of restitution than the control balls, their distance was only slightly shorter. Thus, the golf balls of the invention provide a greater distance per point of C.O.R. as compared to the control balls.

TABLE 7

| Ex. # | Inner Cover Core Type | Material | Dia. mm | Thickness mm | Wgt. G | PGA Comp | C.O.R. ×1000 | Outer Cover Material | Thickness mm | Finished Ball Wgt. g | PGA Comp | C.O.R. ×1000 | 5 Iron @ 128 fps Carry yds | Total yds | Driver @ 160 fps Carry yds | Total yds |
|---|---|---|---|---|---|---|---|---|---|---|---|---|---|---|---|---|
| 6-C1 | K | N.A. | N.A. | N.A. | N.A | N.A. | N.A. | Z | 1.78 | 45.40 | 104 | 792 | 170.10 | 172.1 | 249.5 | 256.6 |
| 6-1 | L | W | 39.20 | 3.50 | 35.80 | 70 | 742 | Z | 1.78 | 44.60 | 105 | 764 | 167.60 | 170.8 | 242.8 | 248.3 |
| 6-2 | L | Y | 39.20 | 3.50 | 35.80 | 74 | 744 | Z | 1.78 | 44.80 | 108 | 759 | 166.40 | 168.4 | 241.2 | 246.4 |
| 6-3 | L | X | 39.20 | 3.50 | 36.30 | 88 | 766 | Z | 1.78 | 45.00 | 114 | 771 | Not Tested | | Not Tested | |
| 6-4 | L | W | 39.90 | 3.81 | 37.10 | 77 | 748 | Y | 1.40 | 45.00 | 107 | 766 | 164.50 | 167.2 | 242.6 | 247.8 |
| 6-5 | L | Y | 39.90 | 3.81 | 37.20 | 82 | 756 | Y | 1.40 | 45.00 | 109 | 765 | 165.50 | 169.6 | 243.1 | 247.9 |
| 6-6 | L | W | 39.20 | 3.50 | 35.80 | 70 | 742 | Y | 1.78 | 44.90 | 107 | 757 | 166.50 | 167.4 | 243.3 | 247.3 |
| 6-C2 | K | N.A. | N.A. | N.A. | N.A. | N.A. | N.A. | Y | 1.78 | 45.70 | 106 | 804 | 167.50 | 171.2 | 251 | 256.7 |
| 6-C3 | K | N.A. | N.A. | N.A. | N.A. | N.A. | N.A. | X | 1.78 | 45.80 | 109 | 807 | 168.50 | 174.4 | 252.2 | 257.4 |
| 6-7 | L | Y | 39.20 | 3.50 | 35.80 | 78 | 744 | X | 1.78 | 45.20 | 111 | 779 | 169.50 | 171.9 | 245.7 | 250.1 |
| 6-8 | L | X | 39.20 | 3.50 | 36.30 | 88 | 766 | X | 1.78 | 45.40 | 116 | 783 | 170.50 | 170.8 | 244.6 | 249.7 |
| 6-9 | L | W | 39.90 | 3.81 | 37.10 | 77 | 748 | X | 1.40 | 45.30 | 112 | 772 | 171.50 | 171.4 | 242.5 | 248.1 |
| 6-10 | L | X | 39.90 | 3.81 | 37.50 | 92 | 768 | X | 1.40 | 45.20 | 118 | 774 | 172.50 | 172.7 | 245.6 | 250.3 |

The foregoing description is, at present, considered to describe the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

We claim:

1. A golf ball comprising:
a solid core comprising a metallocene catalyzed polyolefin and having a PGA compression of no greater than about 85; and
one or more cover layers disposed about the core, the cover layers having an overall cover thickness of at least about 3.6 mm (0.142 inches).

2. The golf ball according to claim 1, wherein the density of the metallocene catalyzed polyolefin is no greater than about 0.950 g/cm$^3$.

3. The golf ball according to claim 1, wherein the core further comprises tungsten.

4. The golf ball according to claim 1, wherein the difference between the coefficient of restitution of the core and the coefficient of restitution of the ball is at least about 0.025.

5. The golf ball according to claim 1, wherein the cover includes a first cover layer disposed about the core and a second cover layer disposed about the first cover layer, each of which has a Shore D hardness of at least 60.

6. The golf ball according to claim 5, wherein the difference between the Shore D hardness of the first cover layer and the Shore D hardness of the second cover layer is no more than 5.

7. The golf ball according to claim 1, wherein one or more of the cover layers comprises an ionomer.

8. The golf ball according to claim 1, wherein the core is peroxide-cured.

9. A golf ball, comprising:
a core comprising a metallocene catalyzed polyolefin, the core having a coefficient of restitution of at least about 0.650 and a PGA compression of no greater than about 85; and
a multi-layer cover disposed about the core, at least one cover layer comprising an ionomer, the cover having a thickness of at least about 3.8 mm (0.150 inches) and a Shore D hardness of at least about 60, the ball having a coefficient of restitution of at least about 0.770.

10. The golf ball according to claim 9, wherein the density of the metallocene catalyzed polyolefin is no greater than about 0.950 g/cm$^3$.

11. The golf ball according to claim 9, wherein the core further comprises tungsten.

12. The golf ball according to claim 9, wherein the difference in the Shore D hardness of the cover layers is no more than 5.

13. The golf ball according to claim 9, wherein the core is peroxide-cured.

14. The golf ball according to claim 9, wherein the multi-layer cover comprises a first cover layer disposed about said core, said first cover layer including a first resin composition and a filler material; and
a second cover layer including a second resin composition, said second cover layer disposed about said first cover layer;
said second resin composition being different than said first resin composition, and the difference between the Shore D hardness of said first cover layer and the Shore D hardness of said second cover layer being less than about 2.

15. A golf ball comprising:
a solid core having a PGA compression of no greater than about 85, wherein the core comprises a metallocene catalyzed polyolefin, and
one or more cover layers disposed about the core, the cover layers having an overall cover thickness of at least about 3.6 mm (0.142 inches) and a Shore D hardness of at least about 60, wherein at least one cover layer comprises a high acid ionomer resin having at least 16% by weight of an alpha, beta-unsaturated carboxylic acid.

16. The golf ball according to claim 15, wherein the at least one cover layer comprising the high acid ionomer resin further comprises a second high acid ionomer resin having at least 16% by weight of an alpha, beta-unsaturated carboxylic acid.

17. The golf ball according to claim 15, said cover comprising a first cover layer disposed about the core and a second cover layer disposed about said first cover layer.

18. The golf ball according to claim 17, wherein said first cover layer and said second cover layer comprise a high acid ionomer resin having at least 16% by weight of an alpha, beta-unsaturated carboxylic acid.

19. The golf ball according to claim 17, wherein at least one of said first cover layer and second cover layer comprise a blend of a high acid ionomer resin having at least 16% by weight of an alpha, beta-unsaturated carboxylic acid.

20. The golf ball according to claim 15, wherein the difference between the coefficient of restitution of the core and the coefficient of restitution of the ball is at least about 0.025.

21. The golf ball according to claim 17, wherein the difference between the Shore D hardness of the first cover layer and the Shore D hardness of the second cover layer is no more than 5.

22. The golf ball according to claim 15, wherein the core is sulfur-cured.

23. The golf ball according to claim 15, wherein the ball has a coefficient of restitution of at least about 0.770.

24. A golf ball comprising:
a core having a PGA compression of no greater than about 85, wherein the core comprises a metallocene catalyzed polyolefin;
a first cover layer disposed about said core, said first cover layer including a first resin composition; and
a second cover layer including a second resin composition, said second cover layer disposed about said first cover layer;
the difference between the Shore D hardness of said first cover layer and the Shore D hardness of said second cover layer being less than about 2, the overall thickness of the first and second cover layer is at least about 3.6 mm, and at least one of said first cover layer and second cover layer comprises a high acid ionomer having at least 16% by weight of an alpha, beta-unsaturated carboxylic acid.

25. The golf ball according to claim 24, wherein the at least one cover layer comprising the high acid ionomer resin further comprises a second high acid ionomer resin having at least 16% by weight of an alpha, beta-unsaturated carboxylic acid.

26. The golf ball according to claim 24, wherein at least one of said first cover layer and second cover layer comprise a blend of high acid ionomer resins having at least 16% by weight of an alpha, beta-unsaturated carboxylic acid.

27. The golf ball according to claim 24, wherein the density of the metallocene catalyzed polyolefin is no greater than about 0.950 g/cm$^3$.

* * * * *